United States Patent Office 3,063,979
Patented Nov. 13, 1962

3,063,979
POLYMERIZATION CATALYSTS
William Lawrence Truett, Wilmington, Del., and Nicholas G. Merckling, deceased, late of Wilmington, Del., by Noelle K. Merckling, administratrix, Baltimore, Md., assignors to E. I. du Pont de Nemours and Company, Wilmington, Del., a corporation of Delaware
No Drawing. Filed Mar. 11, 1959, Ser. No. 798,330
2 Claims. (Cl. 260—94.9)

This invention relates to novel catalyst systems which are highly valuable for the production of solid ethylene polymers and copolymers. This application is a continuation-in-part of our copending application Serial No. 457,544 filed September 21, 1954, now abandoned.

Heretofore, it has been widely known that ethylene can be converted to solid polymers under very high pressures in the presence of catalysts which are capable of yielding free radicals under polymerization conditions.

It has also been known heretofore (U. S. Patents 2,212,155, 2,475,520, 2,467,234) that certain metal alkyls and Grignard reagents are capable of initiating the conversion of ethylene to solid polymers through a free radical mechanism. Ethylene has also been converted to solid polymers in the presence of alkali metals or alkali metal hydrides (British Patent 536,102).

Generally speaking, Friedel-Crafts type catalysts have not been effective for converting ethylene to solid polymers but instead have resulted in the formation of liquid polymers for ethylene; however, it has recently been reported that solid polymers admixed with oils can be obtained by polymerizing ethylene in the presence of aluminum chloride and titanium chloride at elevated temperatures and pressures and advantageously in the presence of HCl-binding metals like aluminum powder (Fischer, German Patent 874,215 Ausgegeben April 20, 1953).

Redox systems have frequently been disclosed for polymerization of olefinic compounds. In the past, redox systems have resulted in the formation of highly branched, low density polymers, except at extremely high superpressures, at which high density ethylene polymers have been obtained heretofore. In many of these systems a heavy metal compound was employed in combination with a reducing component (cf. U. S. Patents 2,380,473 and 3,383,425). While various theories have been advanced as to the mechanism of polymerization in redox systems, the art of polymerizing olefins in the presence of such combinations of catalyst components has not heretofore advanced to the state at which predictions could be made as to which pairs of oxidizable and reducible components might give good results in the conversion of ethylene to solid polymers except, of course, by further experimentation.

It has been discovered in accordance with the present invention that extraordinary and highly useful effects are produced by bringing the reaction product of a polyvalent niobium compound and an organometallic reducing agent into contact with compounds containing ethylenic unsaturation. Preferably, the process of this invention comprises the formation of a reaction medium of an ethylenically unsaturated monomer, a liquid hydrocarbon solvent and a catalyst mixture of 1 mol of niobium pentahalide per 0.5–10 mols of an organometallic reducing agent having at least one metal-to-hydrocarbon bond. In specific embodiments, it has been found that niobium combined with radicals such as alkoxy radicals, alkyl radicals, and radicals which form acids when combined with hydrogen can be used effectively in the polymerization of ethylene or other olefins. The active catalytic form of niobium is generally obtained by admixing a niobium halide in which the niobium is at a valence state of at least three with a reducing agent. The quantity of reducing agent which is present must be sufficient to convert the niobium at least in part to a valence state of less than three. Coordination or the niobium in its reduced valence state with organic components, etc., does not necessarily destroy its ability as a catalyst; in fact, it appears that ethylene is capable of coordinating in this manner with niobium in this reduced valence state, and quite possibly this phenomenon has a bearing on the mechanism of the polymerization.

It is believed that the coordination complexes hereinabove described are novel compounds which have not been employed heretofore in the polymerization of ethylene or other ethylenically unsaturated monomers, e.g. propylene, butene-1 and hexene-1. The nature of these coordination complexes is not fully understood, but they are active catalysts or catalyst components which are capable of initiating the polymerization of ethylene in an extremely active manner to produce solid ethylene polymers having relatively little side chain substitution. The density of the polymers obtained through the use of these coordination complexes generally exceeds, at least to some extent, the density of polyethylene prepared by the use of free radical types of catalysts except those free radical polymerization processes which employ such extremely high pressures as to produce abnormally high density polyethylene as compared with polyethylene made at moderately high pressure (700 to 1200 atmospheres) by a free radical polymerization process (cf. U. S. Patent 2,586,322).

So active, as ethylene polymerization catalysts, are the coordination complexes hereinabove described that they can be used for polymerizing ethylene to solid polymers at room temperature and atmospheric pressure. These complexes can also be employed in the manufacture of numerous other olefin polymers which heretofore have not been obtainable in a desirable form by any polymerization method whatever.

While the polymerization of ethylene to produce solid polymers in the presence of the catalysts herein disclosed can be carried out under extremely mild conditions, and while the process of this invention may be carried out at subatmospheric or superatmospheric pressures, it is preferable from an economic standpoint to employ moderately high pressures, suitably from 1 to 200 atmospheres or higher, in order to facilitate the handling of ethylene. As indicated above, much higher pressures, up to several thousand atmospheres, can be employed, but it is usually not desirable to do this in view of the extraordinary activity of the catalysts at lower pressures. Similarly, extremely low temperatures may be employed. The preferred temperatures are within the range of about 0° C. to 300° C.

The polymerization of ethylene according to the process of this invention, takes place most satisfactorily when the polymerization mixture is substantially free of moisture and other sources of hydroxyl groups, and also is substantially free of carbon dioxide. As in numerous other ethylene polymerization processes, the polymerization mixture in the process of this invention is preferably kept free of oxygen since oxygen reacts with the catalyst. In practical operations the oxygen content should preferably be held below 20 parts per million. Certain compounds which are capable of coordinating with the activated niobium form complexes which are too stable for optimum results, and, accordingly, the presence of these compounds should preferably (although not necessarily) be avoided. In this category are ketones and esters. Hydrocarbon solvents, on the other hand, can be used quite effectively as reaction media in which the coordination complexes are soluble. Preferably, the hydrocarbon solvents are the unsubstituted aliphatic, cycloaliphatic, or aromatic hydrocarbons containing 3–10 carbon atoms per molecule. The novel catalysts described herein are preferably used in dissolved or colloidally dispersed form. The active niobium complex may be prepared in a separate and prior step to the polymerization. In the latter case, it is advisable to keep the catalyst complex at a temperature of about 0° C. and free from contamination with water or air so as to avoid decomposition of the complex.

The invention is illustrated further by means of the following examples:

EXAMPLE 1

Into a vessel there was charged 0.01 mole of niobium pentachloride, 0.05 mole of phenyl magnesium bromide (as a 3 molar solution in ethyl ether), and 50 ml. of cyclohexane at room temperature. These reagents were mixed and reacted vigorously to form a black precipitate. The mixture was diluted to 150 ml. with cyclohexane and charged into a 325 ml. shaker tube at room temperature. The tube was pressured with 2200 to 2500 p.s.i. of ethylene and was shaken for 3 hours at 142° C. to 145° C. during which time the pressure decreased about 1100 p.s.i. The contents of the tube were filtered and washed several times with a mixture of acetone and hydrochloric acid in a Waring Blendor. After vacuum drying, the snow-white polyethylene product was found to weigh 25 grams and exhibited such a high molecular weight that it was not possible to measure the inherent viscosity since the polymer would not dissolve in tetralin at 125° C. Substantially the same results are obtained by substituting niobium pentafluoride, niobium pentabromide, or niobium pentaiodide for niobium pentachloride in the process of this example.

EXAMPLE 2

In to a 325 ml. shaker tube there was charged 0.005 mole of niobium pentachloride, 0.025 mole of phenyl magnesium bromide (as a 3 molar solution in ethyl ether), and 175 mole of cyclohexane. The tube was pressured with 2500 p.s.i. of ethylene and was shaken for 2 hours at 160° C. during which time the pressure dropped 300 p.s.i. After filtering the reaction product and washing with water, hydrochloric acid, sodium hydroxide, and finally acetone, the product was dried under a vacuum at 50° C. The amount of polyethylene which was recovered was 5.5 grams and had a melt index of approximately 4.2. It was observed during the determination of the melt index that there was no visible extrusion of the polymer at 190° C. but that rapid extrusion occurred at 250° C.

Substantially the same results are obtained by substituting equivalent molar amounts of butylsodium, aluminum triphenyl, tetraethyllead, phenylpotassium, lithium aluminum tetrahexyl, or diphenylcadmium for the phenyl magnesium bromide of this example.

EXAMPLE 3

Into a 325 ml. shaker tube there was charged 0.01 mole of niobium pentachloride and 0.05 mole of phenyl magnesium bromide (as a 3 molar solution in ethyl ether) and 50 ml. of cyclohexane. The tube was pressured with 1500 p.s.i. of ethylene and was shaken for 1 hour at 100° C. to 104° C., after which time the pressure had increased to about 1800 p.s.i. The tube was then shaken for 1 additional hour at 150° C., during which time the pressure decreased about 200 p.s.i. The reaction products were filtered and washed successively with hydrochloric acid-dioxane, hydrochloric acid-acetone, sodium hydroxide, and hydrochloric acid-acetone. After drying the product under a high vacuum at 50° C., there was recovered 20 grams of snow-white polyethylene exhibiting a melt index at 360° C. of approximately 0.03. The use of higher pressure permitted a higher rate of extrusion.

EXAMPLE 4

In a series of experimental runs a 325-ml. shaker tube was charged with 100 ml. of either benzene or cyclohexane, 0.005 mol of niobium pentachloride, and one of the following reducing agents in the indicated amount:

0.01 mol tetraphenyltin
0.015 mol tetraphenyltin
0.015 mol tetrabutyltin
0.015 mol diphenylmercury The tube was then pressured with 1000–1200 p.s.i. of ethylene and shaken for ½ to 1 hour at 150°–200° C. In each case the polyethylene recovered from the tube was a high density (0.95 to 0.96) product which could be pressed into a tough, clear film. Substantially the same results are obtained using tetraalkyllead, dialkylcadmium and diarylcadmium in place of the above reducing agents.

It is to be observed that the foregoing examples are illustrative only and that numerous embodiments of the invention will occur to those who are skilled in the art.

The niobium halide used in the processes of the foregoing examples may be any of such halides in which the niobium is at a valence state of three, four, or five, since all of such halides are operable in the process of this invention. Such halides include, for example, niobium pentafluoride, niobium pentachloride, niobium pentabromide, niobium pentaiodide, niobium tetrafluoride, niobium tetrachloride, niobium tetrabromide, niobium tetraiodide, niobium trifluoride, niobium trichloride, niobium tribromide, niobium triiodide, niobium oxytrifluoride, niobium oxytrichloride, niobium oxytribromide, and niobium oxytriiodide. The process of this invention is also operable with mixed halides, for example, niobium trichloridedibromide, and niobium difluoridetribromide.

The above niobium halides when used as a component of the polymerization catalyst or initiator in the process of this invention must be combined with a reducing agent, desirably in amounts stoichiometrically sufficient to reduce the valence of the niobium, at least in part, to less than three. The reducing agents employed in this process are any of several well-known varieties of compounds. In general, the reducing agent is an organometallic compound having at least one metal-to-hydrocarbon bond. Such compounds include the Grignard reagents, the alkali metal alkyls and aryls, the aluminum alkyls and aryls, the alkali metal aluminum tetrahydrocarbons, germanium tetrahydrocarbons, tin tetrahydrocarbons, lead tetrahydrocarbons, zinc dihydrocarbon, cadmium dihydrocarbon, and mercury dihydrocarbon. The Grignard reagents are of the general formula $RMX_{n-1}$ where R is a hydrocarbon group, M is a metal, X is a halogen, and $n$ is the valence of metal M. Grignard reagents are compounds such as methylmagnesium iodide, ethylmagnesium bromide, propylmagnesium chloride, butylmagnesium fluoride, phenylmagnesium bromide, and allyl magnesium bromide. The alkali metal alkyls and aryls include butylsodium, phenylpotassium, and cyclohexyllithium. The aluminum alkyls and aryls include aluminum triethyl, aluminum triphenyl, and aluminum phenyldimethyl. The alkali metal aluminum tetrahydrocarbons include lithium aluminum tetrabutyl, sodium aluminum tetraethyl, potassium aluminum tetrahexyl, and the like. Preferably, the hydrocarbon groups of the alkali metal aluminum tetrahydrocarbon should contain from 1 to about 18 carbon atoms. The hydrocarbon group may be alkyl, cycloalkyl, or aryl.

The catalyst of the process of this invention is a reaction product of a niobium halide, preferably a niobium pentahalide, with an organometallic reducing agent. Typical catalysts are the reaction products of niobium pentachloride and lithium aluminum tetrabutyl, niobium pentachloride and phenylmagnesium bromide, niobium pentaiodide and tetrabutyltin, niobium trichloride and sodium aluminum tetraethyl, niobium tribromide and tetraethyllead, niobium pentabromide and diphenylcadmium, niobium pentafluoride and potassium aluminum tetraphenyl, niobium tetraiodide and lithium aluminum tetradecyl, and niobium oxytrichloride and lithium aluminum tetraoctyl.

The quantity of catalyst to be employed in the process of this invention may vary over a wide range since very small amounts will produce a high molecular weight polymeric product, while large amounts do not reduce the effectiveness of the catalyst. Normally, the amount of catalyst will be from 0.001% to 10% by weight of the monomer. It is known that the formation of an active catalyst for the polymerization of ethylenically unsaturated monomers in the process of this invention does not depend upon the quantities of the two components of the catalyst since a very small amount of reducing agent will change a large amount of niobium pentahalide to an active catalyst. There are, however, some minimum proportions which are apparently desirable for commercial yields of polymer. The proportions of niobium halide to the organometallic reducing agent are preferably such that stoichiometrically there is at least enough reducing agent to reduce the average valence of the niobium to less than three. Preferably, the process of this invention employs from about 0.5 to about 10 mols of the organometallic reducing agent per mol of the niobium halide.

The polymers which are made under the conditions hereinabove described frequently have such tremendously high molecular weights that removal of catalyst by dissolving and filtering is extremely difficult. The best procedure for obtaining the polymer in a clean form is to wash with acetone-hydrochloric acid in a Waring Blendor several times followed by washing with acetone and thereafter, if necessary, followed by several acetone-aqueous sodium hydroxide washes and finally by acetone-water wash. Finally, the polymer can be washed with acetone. The polyethylene products thus obtained are generally snow-white. While this procedure is highly satisfactory for preparing clean polymer, it is to be understood that simpler procedures, such as treatment with water at elevated temperatures, will be entirely suitable for various practical applications. For other applications it is not essential to remove traces of catalyst.

The structure of the polyethylene made in accordance with the process of this invention is characterized by being a straight chain hydrocarbon, with vinyl groups at one or both ends of at least some of the molecules. The infrared measurements indicate very little methyl substitution and a very small number of vinylidene groups with little or no transunsaturation or carbonyl groups.

The ethylene polymers obtained in accordance with the process of this invention are highly valuable in numerous applications especially in the form of films, fibers, rods, tubes, molded articles, extruded insulation on wire, etc. In those embodiments in which the catalyst is not removed from the polymeric product or is only incompletely removed, the products are thermally stable, somewhat surprisingly. When the polymerization is carried out in a system in which the catalyst is dissolved in the inert medium the polymer precipitates from the polymerization mixture in a form which may contain measurable amounts of niobium, e.g. as much as 0.5%. Such compositions are highly useful despite their content of niobium.

Ethylene is not the only olefin that may be polymerized by the catalysts and processes of this invention. Other ethylenically unsaturated monomers, such as propylene, butene-1, hexene-1, butadiene, styrene, and the like are polymerized by the presence of the catalyst in the process of this invention.

What is claimed is:

1. A catalyst composition for the polymerization of ethylenically unsaturated monomers which comprises the reaction product of a niobium pentahalide and an organometallic reducing agent having at least one metal-to-hydrocarbon bond, said reducing agent being present in an amount sufficient to reduce the valence of said niobium, at least in part, to less than 3.

2. The process for polymerizing ethylene comprising forming a reaction medium comprising ethylene, cyclohexane, and the reaction product of niobium pentachloride and phenyl magnesium bromide in the proportions of about 1 mol of niobium pentachloride per 5 mols of phenyl magnesium bromide, said mixture being present in the amount of about 0.001% to 10% by weight of said ethylene, maintaining the reaction medium at 1 to 200 atmospheres and 0° to 300° C., and recovering a linear polyethylene.

References Cited in the file of this patent

FOREIGN PATENTS

| | | |
|---|---|---|
| 778,639 | Great Britain | July 10, 1957 |
| 785,314 | Great Britain | Oct. 23, 1957 |
| 538,782 | Belgium | Dec. 6, 1955 |